(12) United States Patent
Zhang et al.

(10) Patent No.: US 12,373,472 B2
(45) Date of Patent: Jul. 29, 2025

(54) INFORMATION PROCESSING METHOD AND APPARATUS, DEVICE AND READABLE STORAGE MEDIUM

(71) Applicant: Beijing Zitiao Network Technology Co., Ltd., Beijing (CN)

(72) Inventors: Xiaoyan Zhang, Beijing (CN); Haotian Cao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/391,042

(22) Filed: Dec. 20, 2023

(65) Prior Publication Data
US 2024/0119073 A1  Apr. 11, 2024

Related U.S. Application Data

(63) Continuation of application No. PCT/CN2022/117123, filed on Sep. 5, 2022.

(30) Foreign Application Priority Data

Sep. 15, 2021  (CN) .......................... 202111082885.0

(51) Int. Cl.
*G06F 17/00* (2019.01)
*G06F 3/0484* (2022.01)
(Continued)

(52) U.S. Cl.
CPC ........ *G06F 16/3329* (2019.01); *G06F 3/0484* (2013.01); *G06F 16/338* (2019.01)

(58) Field of Classification Search
CPC .. G06F 16/3329; G06F 16/338; G06F 3/0484; G06F 3/0482; G06F 3/04842;
(Continued)

(56) References Cited

U.S. PATENT DOCUMENTS 10,320,727 B1 *  6/2019  Mesters ................ G06F 40/134
10,884,694 B1 *  1/2021  Moy .................... G06F 3/04845
(Continued)

FOREIGN PATENT DOCUMENTS

CN       1790332 A       6/2006
CN     103902674 A       7/2014
(Continued)

OTHER PUBLICATIONS

China National Intellectual Property Administration, Notice of Allowance Issued in Application No. 202111082885.0, Jan. 5, 2023, 5 pages.
(Continued)

*Primary Examiner* — Greta L Robinson
(74) *Attorney, Agent, or Firm* — Alleman Hall & Tuttle LLP

(57) ABSTRACT

Embodiments of the present disclosure provide an information processing method and apparatus, a device, an electronic device, a computer-readable storage medium, a computer program product, and a computer program. The method includes: acquiring comment data corresponding to at least one target media content, where the target media content is media content that has an association with a preset object; acquiring at least one question-and-answer content related to the preset object in the comment data, where the question-and-answer content includes question content and at least one answer content for the question content; aggregating and displaying the at least one question-and-answer content on an interface associated with the preset object.

20 Claims, 4 Drawing Sheets

(51) Int. Cl.
*G06F 16/3329* (2025.01)
*G06F 16/338* (2019.01)

(58) Field of Classification Search
CPC .... G06F 3/0488; G06F 3/0483; G06F 40/169; G06F 40/194; G06F 40/216; G06F 40/30; G06F 40/35; G06F 40/279; G06F 9/453; G06F 9/451; G06F 16/90332; G06F 16/9038

See application file for complete search history.

(56) References Cited

U.S. PATENT DOCUMENTS

| | | | |
|---|---|---|---|
| 11,153,234 B2* | 10/2021 | Wu | G06F 16/9535 |
| 2014/0222512 A1* | 8/2014 | Pace | G06F 3/0484 |
| | | | 705/7.32 |
| 2015/0120718 A1* | 4/2015 | Luo | G06F 16/335 |
| | | | 707/728 |
| 2015/0199382 A1 | 7/2015 | Yamada et al. | |
| 2015/0339396 A1* | 11/2015 | Ayers | G06Q 10/101 |
| | | | 707/734 |
| 2018/0322194 A1* | 11/2018 | Al Qubaisi | G06F 3/165 |
| 2020/0351552 A1 | 11/2020 | Oe et al. | |

FOREIGN PATENT DOCUMENTS

| | | |
|---|---|---|
| CN | 108449642 A | 8/2018 |
| CN | 110521210 A | 11/2019 |
| CN | 111382262 A | 7/2020 |
| CN | 111460221 A | 7/2020 |
| CN | 111666429 A | 9/2020 |
| CN | 112087667 A | 12/2020 |
| CN | 112328136 A | 2/2021 |
| CN | 113076423 A | 7/2021 |
| CN | 113392315 A | 9/2021 |
| CN | 113723087 A | 11/2021 |
| JP | 2018180681 A | 11/2018 |
| WO | 2018186405 A1 | 10/2018 |

OTHER PUBLICATIONS

China National Intellectual Property Administration, Office Action and Search Report Issued in Application No. 202111082885.0, Aug. 29, 2022, 9 pages. Submitted with partial English translation.
ISA China National Intellectual Property Administration, International Search Report Issued in Application No. PCT/CN2022/117123, Nov. 29, 2022, 14 pages.
European Patent Office, Extended European Search Report Issued in Application No. 22869068.1, Jul. 1, 2024, 8 pages.
Japan Patent Office, Notice of Reasons for Refusal for Japanese Application No. 2023-579293, mailed Dec. 10, 2024, 8 pages.
Paxata, Practice Data Preparation, fourth Japan IT Week Winter, Jan. 29, 2020, 25 pages. Submitted with English explanation of relevance.

* cited by examiner

INFORMATION PROCESSING METHOD AND APPARATUS, DEVICE AND READABLE STORAGE MEDIUM

CROSS-REFERENCE TO RELATED APPLICATIONS

This disclosure is a continuation of International Application No. PCT/CN2022/117123, filed on Sep. 5, 2022, which claims priority to Chinese Patent Application No. 202111082885.0, filed with the China National Intellectual Property Administration on Sep. 15, 2021. Both of the applications are hereby incorporated by reference in their entireties.

TECHNICAL FIELD

Embodiments of the present disclosure relate to the technical field of computer and network communication and, in particular to an information processing method and apparatus, a device, an electronic device, a computer-readable storage medium, a computer program product and a computer program.

BACKGROUND

In the process of using Internet, to better understand the currently displayed content, a question-and-answer area can be set up on a display interface for a user, so that the user can view questions in the question-and-answer area by himself, or the user can initiate a question in the question-and-answer area based on actual needs.

SUMMARY

Embodiments of the present disclosure provide an information processing method and apparatus, a device, an electronic device, a computer-readable storage medium, a computer program product, and a computer program, which are used to solve the technical problem in the existing art that there is relatively little content since a user needs to actively trigger and fill in question-and-answer content in the question-and-answer information.

According to a first aspect, an embodiment of the present disclosure provides an information processing method, including:
acquiring comment data corresponding to at least one target media content, where the target media content is media content that has an association with a preset object, and the comment data includes text data and/or video data and/or audio data;
acquiring at least one question-and-answer content related to the preset object in the comment data, where the question-and-answer content includes question content and at least one answer content for the question content;
aggregating and displaying the at least one question-and-answer content on an interface associated with the preset object.

According to a second aspect, an embodiment of the present disclosure provides an information processing apparatus, including:
an acquiring module, configured to acquire comment data corresponding to at least one target media content, where the target media content is media content that has an association with a preset object, and the comment data includes text data and/or video data and/or audio data;
an extracting module, configured to acquire at least one question-and-answer content related to the preset object in the comment data, where the question-and-answer content includes question content and at least one answer content for the question content;
a displaying module configured to aggregate and display the at least one question-and-answer content on an interface associated with the preset object.

According to a third aspect, an embodiment of the present disclosure provides an electronic device, including a processor and a memory;
the memory stores computer execution instructions;
the processor executes the computer executed instructions stored in the memory, so that the processor executes the information processing method as described in the first aspect and various possible designs of the first aspect.

According to a fourth aspect, an embodiment of the present disclosure provides a computer-readable storage medium in which computer execution instructions are stored. When a processor executes the computer execution instructions, the information processing method as described in the first aspect and various possible designs of the first aspect is implemented.

According to a fifth aspect, an embodiment of the present disclosure provides a computer program product including a computer program, when the computer program is executed by a processor, the information processing method as described in the first aspect and various possible designs of the first aspect is implemented.

According to a sixth aspect, an embodiment of the present disclosure provides a computer program, when the computer program is executed by a processor, the information processing method as described in the first aspect and various possible designs of the first aspect is implemented.

Embodiments of the present disclosure provide an information processing method and apparatus, a device, a computer-readable storage medium, and a computer program product, in the method, firstly at least one comment data corresponding to target media content which has an association with a preset object is acquired, to acquire at least one question-and-answer content related to the preset object in the comment data, at least one question-and-answer content acquired is aggregated and displayed on an interface associated with the preset object.

BRIEF DESCRIPTION OF DRAWINGS

To describe the technical solutions in embodiments of the present disclosure or in the prior art more clearly, in the following, the accompanying drawings needed for describing the embodiments or the existing art will be briefly introduced. The accompanying drawings in the following description illustrate merely some embodiments of the present disclosure, and persons of ordinary skill in the art may still derive other drawings from these accompanying drawings without paying creative effort.

DESCRIPTION OF EMBODIMENTS

To make the objectives, technical solutions, and advantages of embodiments of the present disclosure clearer, in the following, the technical solutions in the embodiments of the present disclosure will be clearly and comprehensively described with reference to the accompanying drawings of the embodiments of the present disclosure. The described embodiments are merely a part rather than all embodiments of the present disclosure. All other embodiments obtained by persons of ordinary skill in the art based on the embodiments of the present disclosure without paying creative effort shall fall within the protection scope of the present disclosure.

At present, in relevant technical solutions, when question-and-answer information is displayed, the generation of the question-and-answer information needs to be triggered actively by a user, generally there are few questions and answers available for display, which cannot meet the actual needs of users.

Aiming at the aforementioned technical problem in the existing art that there is relatively little content since a user needs to actively trigger and fill in question-and-answer content in the question-and-answer information, the present disclosure provides an information processing method and apparatus, a device, a readable storage medium, and a product.

It should be noted that the information processing method and apparatus, device, readable storage medium and product provided in the present disclosure can be used in scenarios where various question-and-answer content is acquired.

To enable a user to better understand the preset object(s) associated with media content, generally a question-and-answer area can be set at a corresponding position of the media content, the user can click the question-and-answer area to ask questions and view answers to existing questions. However, there is relatively little question-and-answer content in the question-and-answer area obtained by the above method, and the user may not be able to obtain the desired content after clicking in the question-and-answer area, resulting in poor user experience.

In the process of solving the above technical problem, the inventor found through research that the media content associated with the preset object generally contains a lot of comment data, and the comment data often contains question-and-answer content that helps users understand the preset object. Therefore, to enrich the question-and-answer content in the question-and-answer area, the question-and-answer content in the comment data can be acquired, and the question-and-answer content acquired from the comment data can be aggregated and displayed on an interface associated with the preset object.

Figure 1:
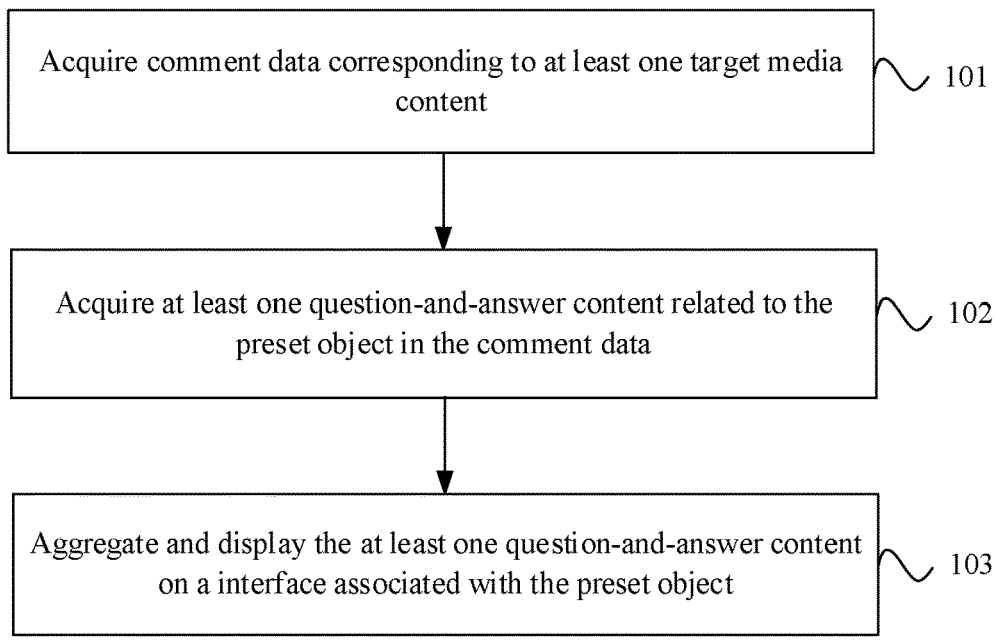
FIG. 1 is a flowchart of an information processing method provided by Embodiment 1 of the present disclosure.

FIG. 1 is a flowchart of an information processing method provided by Embodiment 1 of the present disclosure, as shown in FIG. 1, the method includes:

step 101: acquire comment data corresponding to at least one target media content, where the target media content is media content that has an association with a preset object, and the comment data includes text data and/or video data and/or audio data.

The execution subject body of the embodiment is an information processing apparatus which can be coupled to a server, and the server can be communicatively connected with a database to acquire the comment data. The server can also be communicatively connected with a terminal device of a user, so that data processing can be carried out according to the human-machine interaction between the user and the terminal device.

In the embodiment, the media content associated with the preset object generally contains a lot of comment data, and the comment data often contains question-and-answer content that helps users understand the preset object. Therefore, to achieve the acquisition of question-and-answer content, first of all, comment data corresponding to at least one target media content can be acquired. Among them, the target media content is media content that is associated with the preset object. Specifically, the preset object can be a restaurant, a scenic spot, a museum, etc. The media content can be any kind of media content such as video, article, audio or the like. The comment data corresponding to the target media content is the comment(s) made by users of an application program on the target media content, and the comment data can be displayed on the comment panel of the target media content.

Specifically, the media content that is associated with the preset object can be understood as including the following situations: the target media content including a label corresponding to the preset object, and/or, the text content corresponding to the target media content including a field associated with the preset object, and/or, the comment data corresponding to the target media content including a field associated with the preset object, and/or, image content corresponding to the target media content including an image corresponding to the preset object. A preset object can correspond to multiple target media content, and types of associations between multiple target media content and the preset object can be different.

In practical applications, for example, the target media content can be short video content published on a short video software, and the preset object can be a restaurant where the user punches in. The association between the target media content and the preset object can be that a label of the restaurant is included in the short video content, and the user can enter a relevant interface of the restaurant by triggering the label. Alternatively, following the example above, the short video content can include text content that introduces the short video. The association between the target media content and the preset object can be that a name of the restaurant is included in the text content. Alternatively, following the above example, the comment data corresponding to the short video content includes at least one comment about the restaurant. In this case, it can be determined that the short video content is associated with the restaurant. Alternatively, following the example above, at least one frame of image in the short video content includes the restaurant. In this case, it can be determined that the short video content is associated with the restaurant.

In practical applications, one or more of the above methods can be adopted to determine the association between the target media content and the preset object, which is not limited in the present disclosure.

In an embodiment, the comment data includes text data and/or video data and/or audio data. When the comment data is text data, data analysis can be directly performed on the text data to achieve the acquiring operation of the question-and-answer content.

When the comment data is audio data, the audio data can be converted to corresponding text data, and then the question-and-answer content can be extracted from the text data.

When the comment data is video data, to acquire the question-and-answer content, it is necessary to understand the content of the video data. In an embodiment, image processing can be performed on each frame of image in the video data to extract the question-and-answer content. Alternatively, image frames in the video data can be sampled at a preset sampling rate, and the collected samples can be processed to extract the question-and-answer content. At the same time, the extraction of the question-and-answer content can be achieved based on a combination of the image data acquired from image processing and audio content extracted from the video data.

Step 102: acquire at least one question-and-answer content related to the preset object in the comment data, where the question-and-answer content includes question content and at least one answer content for the question content.

In an embodiment, the at least one question-and-answer content related to the preset object may be acquired by performing an extraction operation on the comment data.

In the present implementation, since the comment data includes a large amount of data, some of which is related to the preset object and some of which is unrelated to the preset object, it is also necessary to acquire at least one question-and-answer content related to the preset object in the comment data.

Among them, the question-and-answer content includes the question content, and the at least one answer content corresponding to the question content. Following the example above, the question content can be: are there many people in the restaurant, and the corresponding answer content can be: there are a large number of people, there are a large number of people during peak hours, and there are a relatively large number of people at 7 pm.

Step 103: aggregate and display the at least one question-and-answer content on an interface associated with the preset object.

In the embodiment, after acquiring the at least one question-and-answer content, since some of the question-and-answer content may include the same or similar questions, in order to optimize the question-and-answer content, it is possible to aggregate the at least one question-and-answer content and display the at least one question-and-answer content aggregated on an interface associated with the preset object.

In an embodiment, the associated interface can be a question-and-answer interface. When browsing the target media content, a user can view the preset object corresponding to the target media content. A question-and-answer area can be set in the display interface of the preset object. The user can trigger the question-and-answer area to view the associated interface, the at least one question-and-answer content is displayed in the associated interface.

In an embodiment, when the comment data is video data and/or audio data, after extracting the video data and/or audio data including question-and-answer content, the video data and/or audio data can be converted into text form, and question-and-answer content in text form can be aggregated and displayed with the associated interface of the preset object. Alternatively, after extracting the video data and/or audio data including question-and-answer content, the video data and/or audio data including question-and-answer content can be displayed directly in the associated interface. Further, a conversion text icon can be set in a preset area around the question-and-answer content in the form of video data and/or audio data, and the user can trigger the conversion text icon to convert the video data and/or audio data into the question-and-answer content in text form for viewing.

Furthermore, based on Embodiment 1, step 101 includes:
acquire at least one target media content with at least one interactive data quantity exceeding a preset comment quantity threshold and/or the quantity of plays exceeding a preset play quantity threshold;
acquire the comment data for the at least one target media content.

In the embodiment, for a large number of existing application software, the amount of media content is relatively large. Therefore, to achieve accurate screening of question-and-answer content, it is first necessary to screen out the at least one target media content from a large amount of media content. Screening can be performed based on the interactive data quantity of the target media content. Among them, the interactive data quantity includes but is not limited to quantity of comments, likes, forwards, and favorites corresponding to the target media content. Specifically, it is possible to acquire at least one target media content which has at least one kind of interactive data quantity exceeding the preset comment quantity threshold and/or whose quantity of plays exceeds the preset play quantity threshold, and acquire the comment data corresponding to the at least one target media content.

According to the information processing method provided by the embodiment, comment data corresponding to at least one target media content that has an association with a preset object is acquired, to acquire at least one question-and-answer content related to the preset object in the comment data, then the at least one question-and-answer content acquired is aggregated and displayed on an interface associated with the preset object, so that the question-and-answer content can be extracted from the comment data of the target media content. Different from technical solutions in related art that a user needs to ask questions and answer questions actively, by acquiring the question-and-answer content in the comment data, the acquisition efficiency of the question-and-answer content can be effectively improved, thus increasing users' understanding of the preset object, bringing convenience to users, and improving user experience.

In an embodiment, the at least one question-and-answer content related to the preset object is obtained based on the comment data.

In an embodiment, based on any of the above embodiments, step 102 includes:
input the comment data into a preset question-and-answer content extraction model to obtain the at least one question-and-answer content related to the preset object in the comment data;
where the question-and-answer content extraction model is obtained after training a preset model to be trained by using a sample question-and-answer content data set, the sample question-and-answer content data set includes comment data corresponding to multiple target media content and annotation information corresponding to each comment data, and the annotation information is used for representing whether the comment data includes question-and-answer content.

In the embodiment, a question-and-answer content extraction model can be preset, and comment data can be input into the question-and-answer content extraction model to obtain at least one question-and-answer content related to the preset object in the comment data. Specifically, to obtain the question-and-answer content extraction model, a preset sample question-and-answer content dataset can be acquired first. The sample question-and-answer content dataset includes comment data corresponding to multiple target media content and annotation information corresponding to each comment data. The annotation information is used for representing whether the comment data includes question-and-answer content. The sample question-and-answer content dataset is used for training the preset model to be trained until the model to be trained converges, to obtain the question-and-answer content extraction model.

Figure 2:
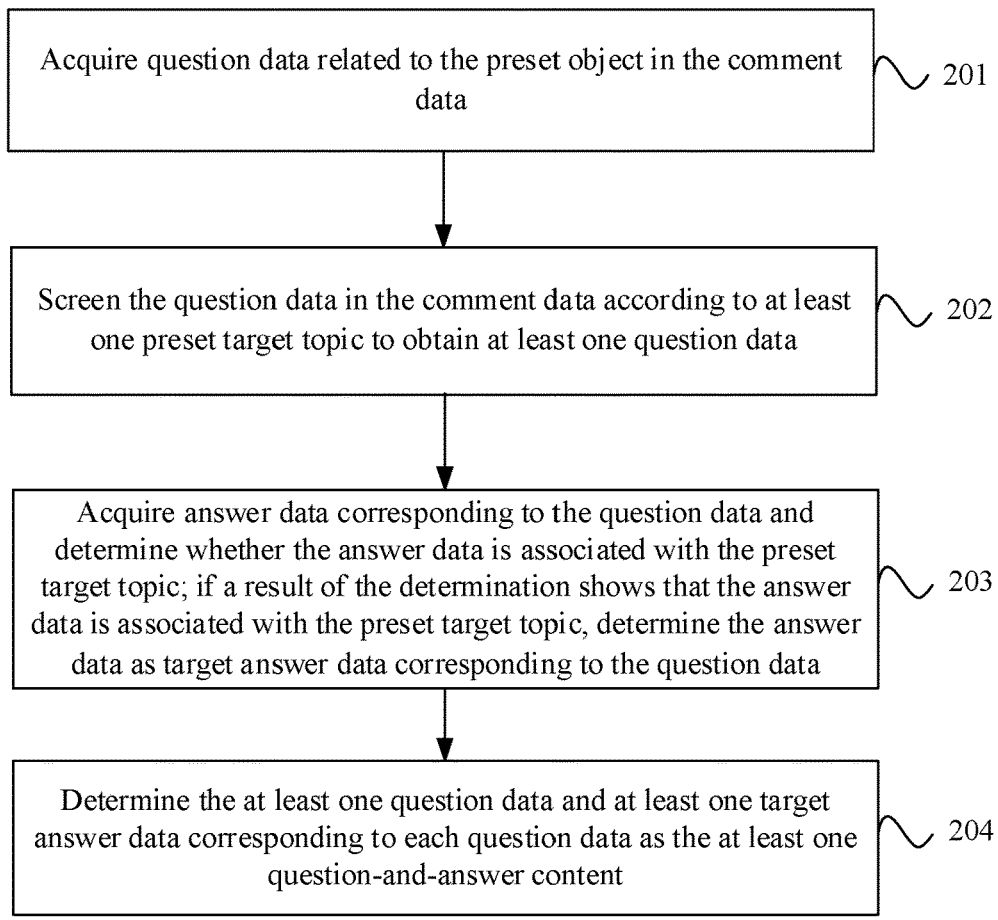
FIG. 2 is a flowchart of an information processing method provided by Embodiment 2 of the present disclosure.

FIG. 2 shows a flowchart of the information processing method provided by Embodiment 2 of the present disclosure, based on Embodiment 1, step 102 includes:

step 201: acquire question data related to the preset object in the comment data;

step 202: screen the question data in the comment data according to at least one preset target topic to obtain at least one question data, where the target topic is a characteristic information topic corresponding to the preset object;

step 203: acquire answer data corresponding to the question data and determine whether the answer data is associated with the preset target topic; if a result of the determination shows that the answer data is associated with the preset target topic, determine the answer data as target answer data corresponding to the question data;

step 204: determine the at least one question data and at least one target answer data corresponding to each question data as the at least one question-and-answer content.

In the embodiment, after obtaining the question-and-answer data, further data processing operations can be performed on the question-answering data. Among them, the question-and-answer data can be obtained through extraction of comment data using the above question-and-answer content extraction model, or can also be obtained by using any other method, which is not limited in the present disclosure.

Specifically, the first step is to acquire the question data related to the preset object in the comment data and screen the question data in the comment data according to at least one preset target topic to obtain at least one question data. Among them, the target topic is the characteristic information topic corresponding to the preset object. For example, the target topic could be: taste, location, opening hours, the number of people and other characteristic information.

To achieve the acquisition of effective answer data, for the above question data, acquire answer data corresponding to the question data, determine whether the answer data is related to the preset target topic, and if so, determine the answer data as the target answer data corresponding to the question data, and determine the at least one question data and at least one target answer data corresponding to each question data as the at least one question-and-answer content.

Further, based on any of the above embodiments, the determining whether the answer data is associated with the preset target topic in step 203 includes:

determine whether the answer data includes the preset target topic, and/or whether the answer data includes a target field corresponding to the target topic, to obtain the result of the determination.

In the embodiment, in the process of screening the answer data, it is possible to determine whether the answer data includes the preset target topic. For example, if the target topic is "delicious", if the answer data includes the "delicious" topic, this answer data can be determined to be the target answer data.

In an embodiment, it is possible to determine whether the answer data includes a target field corresponding to the target topic to obtain the result of the determination. For example, the target topic can be "Where", the target field can be: xx district, xx street, xx building, etc. If it is detected that the answer data includes the above target field, this answer data can be determined to be the target answer data.

In the information processing method provided by the embodiment, a question-and-answer content extraction model is used for acquiring the question-and-answer content in the comment data, thus enabling a user to obtain content with better quality from the question-and-answer content and improving user experience.

Figure 3:
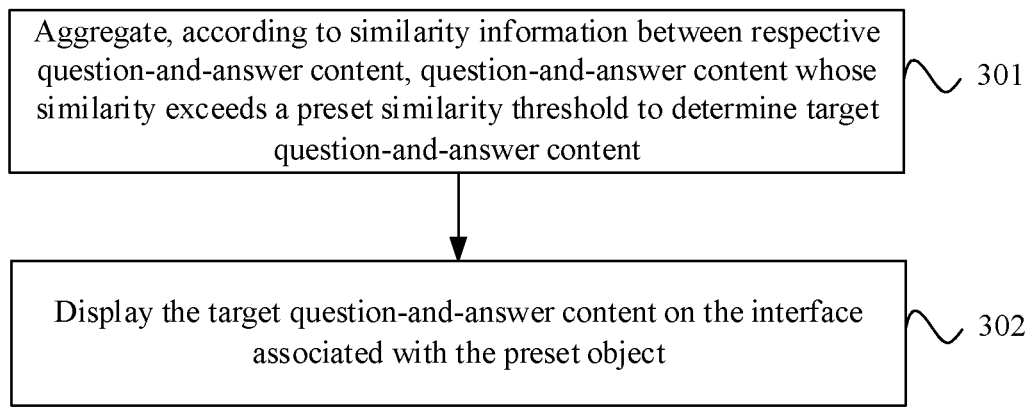
FIG. 3 is a flowchart of an information processing method provided by Embodiment 3 of the present disclosure.

FIG. 3 shows a flowchart of the information processing method provided by Embodiment 3 of the present disclosure. Based on any of the above embodiments, step 103 includes:

step 301: aggregate, according to similarity information between respective question-and-answer content, question-and-answer content whose similarity exceeds a preset similarity threshold to determine target question-and-answer content;

step 302: display the target question-and-answer content on the interface associated with the preset object.

In an embodiment, similarity information between respective of question-and-answer content can be calculated before the aggregation.

In the present embodiment, because part of the question-and-answer content may include the same or similar questions, to optimize the question-and-answer content, at least one question-and-answer content can be aggregated and displayed on the interface associated with the preset object.

Specifically, at least one question-and-answer content whose similarity exceeds the preset similarity threshold can be determined according to the similarity information between respective question-and-answer content, the at least one question-and-answer content whose similarity exceeds the preset similarity threshold can be aggregated to obtain the target question-and-answer content, and the target question-and-answer content is displayed on the interface associated with the preset object.

In an embodiment, after aggregating the at least one question-and-answer content whose similarity exceeds the preset similarity threshold, one of the question-and-answer content and the corresponding answer data can be displayed on the associated interface. In addition, an expansion button can be displayed within a preset range around the currently displayed question-and-answer content, and multiple question-and-answer content aggregated can be displayed according to the user's triggering operation on the expansion button. In an embodiment, the text content on the expansion button can be: expansion, X people want to know or the like, where X includes the quantity of question-and-answer content that has been aggregated.

Furthermore, based on any of the above embodiments, the method further includes:

determine a quantity of question-and-answer content whose similarity with the target question-and-answer content exceeds a preset threshold;

update a quantity of followers corresponding to the target question-and-answer content according to the quantity of the question-and-answer content and a quantity of triggering actions from a user on a follow button associated with the target question-and-answer content.

In the embodiment, different question-and-answer content has different quantities of followers. To determine the quantity of followers, it is possible to determine the quantity of the question-and-answer content whose similarity with the target question-and-answer content exceeds the preset threshold. This quantity can represent the number of users in the comment data who want to know about the question-and-answer content.

Furthermore, the display interface can also display the follow button, the user can realize the following of the question-and-answer content by triggering the follow button. After the user triggers the follow button, when there is new answer data for the question-and-answer content, a reminder of the question-and-answer content can be sent to the user through a private message.

Specifically, update a quantity of followers corresponding to the target question-and-answer content according to the quantity of the question-and-answer content and a quantity of triggering actions from a user on a follow button associated with the target question-and-answer content.

After the quantity of followers corresponding to the target question-and-answer content is updated, the target question-and-answer content can be sorted according to the quantity of followers, and the target question-and-answer content with a higher quantity of followers, that is, the question-and-answer content that more users want to know is ranked at the top position, enabling users to quickly learn about relevant content.

Furthermore, based on any of the above embodiments, after step 103, it further includes:
- updating a quantity of interactions (interaction quantity) of the question-and-answer content according to a quantity of interactions of the question-and-answer content on the interface associated with the preset object and a quantity of interactions of comment data corresponding to the question-and-answer content in the target media content.

In the embodiment, in the process of viewing the question-and-answer content, the user can also carry out interactive operations on the question-and-answer content, among which the interactive operations can be like, forward, favorite, etc. The quantity of interactions of question-and-answer content on the interface associated with the preset object and the quantity of interactions of the question-and-answer content in the original comment data are determined, and the quantity of interactions of the question-and-answer content is updated according to the quantity of interactions of the question-and-answer content on the interface associated with the preset object and the quantity of interactions of comment data corresponding to the question-and-answer content in the target media content.

Figure 4:
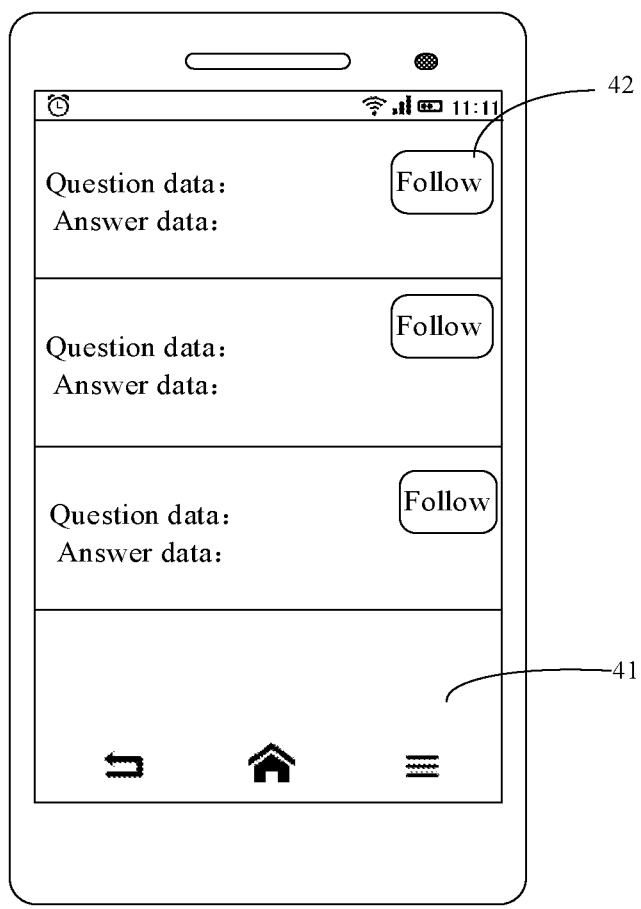
FIG. 4 is a schematic structural diagram of a display interface provided by an embodiment of the present disclosure.

FIG. 4 is a schematic structural diagram of a display interface provided by an embodiment of the present disclosure. As shown in FIG. 4, a preset interactive icon 42 is set on an interface 41 associated with a preset object, and a user can trigger the interaction icon 42 through the interface interaction to update the quantity of interactions.

Figure 5:
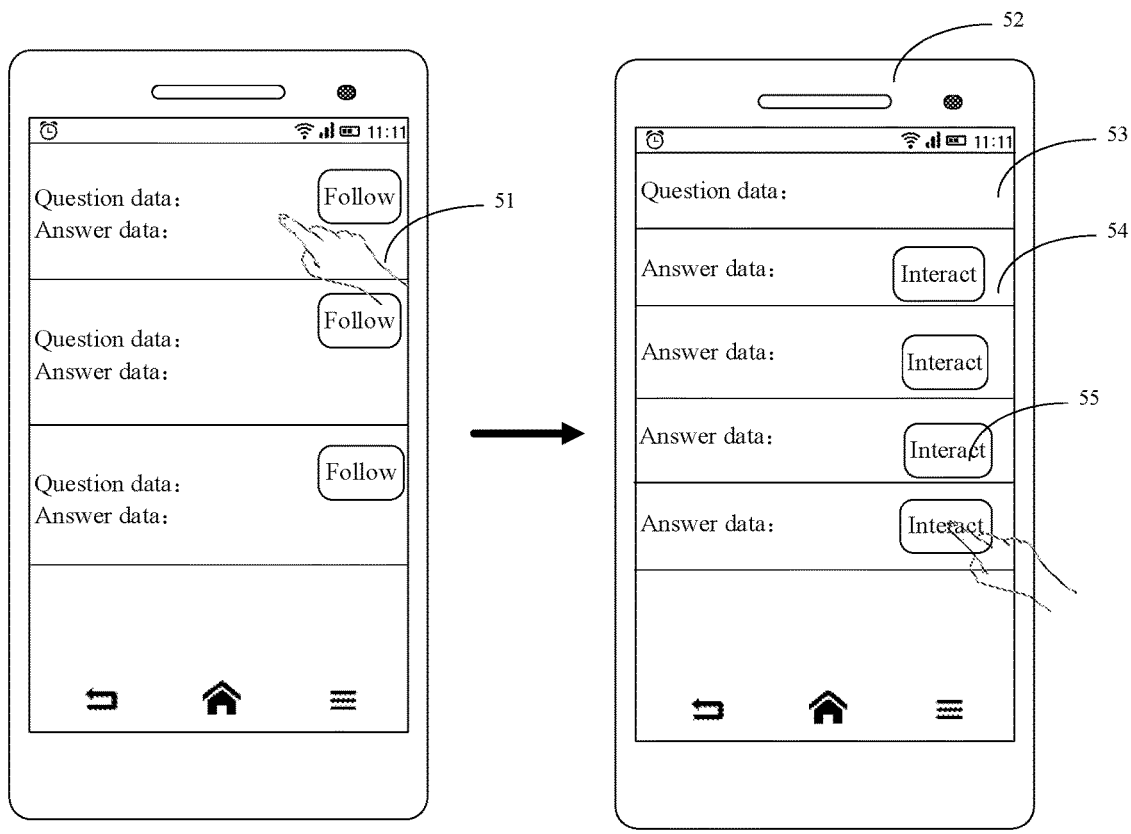
FIG. 5 is a schematic structural diagram of another display interface provided by an embodiment of the present disclosure.

FIG. 5 is a schematic structural diagram of another display interface provided by an embodiment of the present disclosure. As shown in FIG. 5, in response to a triggering operation from a user on any question-and-answer content 51, redirection to a detail interface 52 corresponding to the question-and-answer content is conducted. The detail interface 52 includes question information 53 corresponding to the question-and-answer content and at least one answer information 54. For each answer information 54, an interactive icon 55 corresponding to the answer information 54 is set in a preset area around this answer information 54. A user can trigger the interactive icon 55 to realize the interactive operation on the answer information 54.

In an embodiment, the quantity of interactions of the answer information can be updated based on the user's interaction with the answer information and the quantity of interactions in the comment data corresponding to the answer information.

Furthermore, based on any of the above embodiments, the method further includes:
- in response to an operation from a user for deleting comment data of target media content, delete question-and-answer content corresponding to the comment data.

In the embodiment, the user can delete the comment data according to actual needs. When it is detected that the user has deleted the comment data, the question-and-answer content can be deleted according to the deletion operation.

Specifically, if it is detected that the user has deleted the answer data in the comment data, the corresponding answer data in the question-and-answer content can be deleted. If it is detected that the user has deleted the question data in the comment data, the entire question-and-answer content can be deleted according to the deletion operation.

According to the information processing method provided in the embodiment, user experience is further improved by aggregating and displaying the question-and-answer content.

Figure 6:
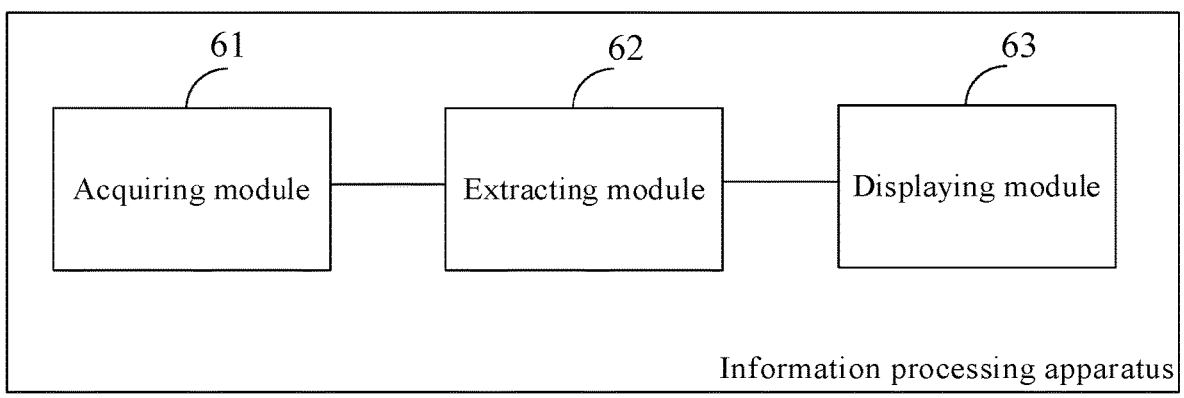
FIG. 6 is a schematic structural diagram of an information processing apparatus provided by Embodiment 4 of the present disclosure.

FIG. 6 is a schematic structural diagram of an information processing apparatus provided by Embodiment 4 of the present disclosure. As shown in FIG. 6, the information processing apparatus includes: an acquiring module 61, an extracting module 62 and a displaying module 63. Among them, the acquiring module 61 is configured to acquire comment data corresponding to at least one target media content, where the target media content is media content that has an association with a preset object, and the comment data includes text data and/or video data and/or audio data; the extracting module 62 is configured to acquire at least one question-and-answer content related to the preset object in the comment data, where the question-and-answer content includes question content and at least one answer content for the question content; the displaying module 63 is configured to aggregate and display the at least one question-and-answer content on an interface associated with the preset object.

Furthermore, based on Embodiment 4, the acquiring module 61 is configured to:
- acquire at least one target media content with at least one interactive data quantity exceeding a preset comment quantity threshold and/or a quantity of plays exceeding a preset play quantity threshold;
- acquire the comment data for the at least one target media content.

Furthermore, based on any of the above embodiments, the target media content includes a label corresponding to the preset object, and/or, text content corresponding to the target media content includes a field associated with the preset object, and/or, the comment data corresponding to the target media content includes a field associated with the preset object, and/or, image content corresponding to the target media content includes an image corresponding to the preset object.

Furthermore, based on any of the above embodiments, the extracting module 62 is configured to:
  acquire question data related to the preset object in the comment data;
  screen the question data in the comment data according to at least one preset target topic to obtain at least one question data, where the target topic is a characteristic information topic corresponding to the preset object;
  acquire answer data corresponding to the question data and determining whether the answer data is associated with the preset target topic; if a result of the determination shows that the answer data is associated with the preset target topic, determining the answer data as target answer data corresponding to the question data;
  determine the at least one question data and at least one target answer data corresponding to each question data as the at least one question-and-answer content.

Furthermore, based on any of the above embodiments, the extracting module 62 is configured to:
  determine whether the answer data includes the preset target topic, and/or whether the answer data includes a target field corresponding to the target topic, to obtain the result of the determination.

Furthermore, based on any of the above embodiments, the extracting module 62 is configured to:
  input the comment data into a preset question-and-answer content extraction model to obtain the at least one question-and-answer content related to the preset object in the comment data;
  where the question-and-answer content extraction model is obtained after training a preset model to be trained by using a sample question-and-answer content data set, the sample question-and-answer content data set includes comment data corresponding to multiple target media content and annotation information corresponding to each comment data, and the annotation information is used for representing whether the comment data includes question-and-answer content.

Furthermore, based on any of the above embodiments, the displaying module 63 is configured to:
  aggregate, according to the similarity information between respective question-and-answer content, question-and-answer content whose similarity exceeds a preset similarity threshold to determine target question-and-answer content;
  display the target question-and-answer content on the interface associated with the preset object.

Furthermore, based on any of the above embodiments, the apparatus further includes:
  a determining module, configured to determine a quantity of question-and-answer content whose similarity with the target question-and-answer content exceeds a preset threshold;
  an updating module, configured to update a quantity of followers corresponding to the target question-and-answer content according to the quantity of the question-and-answer content and a quantity of triggering actions from a user on a follow button associated with the target question-and-answer content.

Furthermore, based on any of the above embodiments, the apparatus further includes:
  an updating module, configured to update a quantity of interactions of the question-and-answer content according to a quantity of interactions of the question-and-answer content on the interface associated with the preset object and a quantity of interactions of comment data corresponding to the question-and-answer content in the target media content.

Furthermore, based on any of the above embodiments, the apparatus further includes:
  a deleting module, configured to delete, in response to an operation from a user for deleting comment data of target media content, question-and-answer content corresponding to the comment data.

Another embodiment of the disclosure also provides a computer-readable storage medium in which computer execution instructions are stored, and when the processor executes the computer execution instructions, the information processing method as described in any of the above embodiments is implemented.

Another embodiment of the present disclosure also provides a computer program product including a computer program, when the computer program is executed by a processor, an information processing method as described in any of the aforementioned embodiments is implemented.

The device provided in the embodiment can be configured to execute the technical solutions of the above method embodiments, and the implementation principle and technical effects thereof are similar, and will not be repeated here.

In order to implement the above embodiments, an embodiment of the present disclosure also provides an electronic device.

Another embodiment of the present disclosure also provides an electronic device including a processor and a memory;
  the memory stores computer execute instructions;
  the processor executes computer execution instructions stored in the memory, so that the processor executes the information processing method as described in any of the above embodiments.

Figure 7:
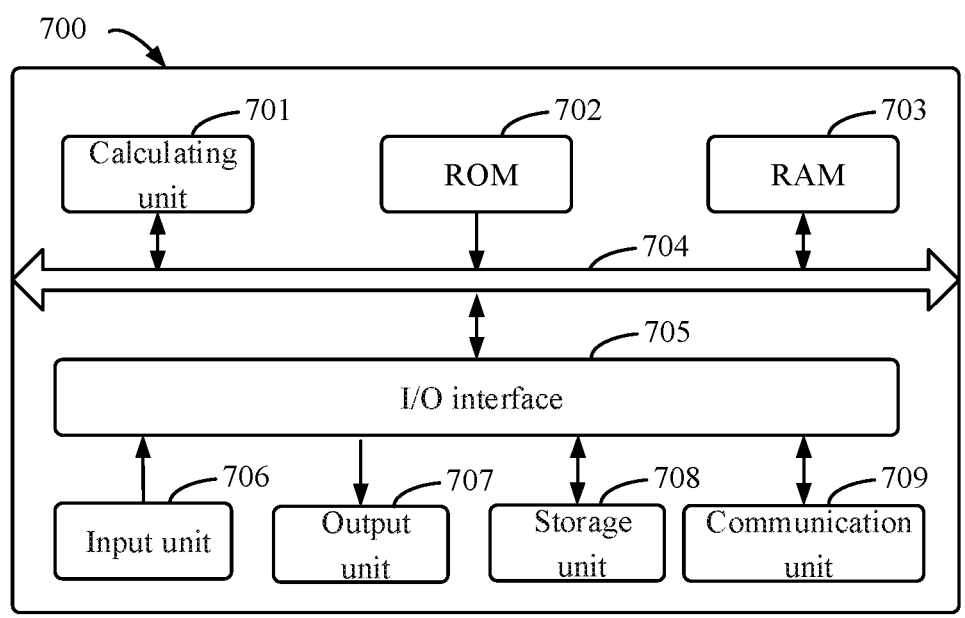
FIG. 7 is a schematic structural diagram of an electronic device provided by Embodiment 5 of the present disclosure.

FIG. 7 is a schematic structural diagram of an electronic device provided by Embodiment 5 of the present disclosure. Referring to FIG. 7, a schematic structural diagram of an electronic device 700 suitable for implementing an embodiment of the present disclosure is shown. The electronic device 700 can be a terminal device or a server. Here, the terminal device may include, but is not limited to, a mobile terminal such as a mobile phone, a notebook computer, a digital broadcast receiver, a personal digital assistant (PDA), a portable android device (PAD), a portable multimedia player (PMP), a vehicle terminal (e.g. a vehicle navigation terminal), etc., and a fixed terminal such as a digital TV, a desktop computer, and the like. The electronic device shown in FIG. 7 is only one example and should not impose any limitation on the function and scope of use of the embodiments of the present disclosure.

As shown in FIG. 7, the electronic device 700 may include a calculating unit (e.g. a central processor, a graphic processor, etc.) 701 that may execute various suitable actions and processes in accordance with a program stored in a read only memory (ROM) 702 or a program loaded from a storage unit 708 into a random access memory (RAM) 703. In the RAM 703, various programs and data required for the operation of the electronic device 700 are also stored. The calculating unit 701, the ROM 702, and the RAM 703 are connected to each other via a bus 704. An input/output (I/O) interface 705 is also connected to a bus 704.

In general, the following units may be connected to the I/O interface 705: an input unit 706 including, for example, a touch screen, a touch pad, a keyboard, a mouse, a camera, a microphone, an accelerometer, a gyroscope, etc.; an output unit 707 including, for example, a liquid crystal display (LCD), a speaker, a vibrator, etc.; a storage unit 708 including, for example, a magnetic tape, a hard disk, etc.; and a communication unit 709. The communication unit 709 may allow the electronic device 700 to communicate in a wireless or wired manner with other units to exchange data. Although FIG. 7 illustrates an electronic device 700 having various units, it is to be understood that not all illustrated units are required to be implemented or provided. More or fewer units may alternatively be implemented or provided.

In particular, processes described above with reference to flow diagrams may be implemented as computer software programs in accordance with the embodiments of the present disclosure. For example, an embodiment of the present disclosure includes a computer program product including a computer program borne on a computer-readable medium, the computer program includes program codes for executing the method illustrated in the flow diagrams. In such embodiments, the computer program may be downloaded and installed from a network via the communication unit 709, or installed from the storage unit 708, or installed from the ROM 702. The computer program, when executed by the calculating unit 701, executes the above functions defined in the method of the embodiments of the present disclosure.

It needs to be noted that the computer-readable medium described above in the present disclosure can be either a computer-readable signal medium or a computer-readable storage medium or any combination of the two. The computer-readable storage medium can be, for example, but not limited to, an electronic, magnetic, optical, electromagnetic, infrared, or semiconductor system, apparatus, or component, or a combination of any of the foregoing. More specific examples of the computer-readable storage medium may include, but are not limited to: an electrical connection having one or more leads, a portable computer diskette, a hard disk, a random access memory (RAM), a read only memory (ROM), an erasable programmable read only memory (EPROM or flash memory), an optical fiber, a portable compact disc read only memory (CD-ROM), an optical storage apparatus, a magnetic storage apparatus, or any suitable combination thereof. In the present disclosure, the computer-readable storage medium may be any tangible medium that can contain or store a program. The program can be used by or in connection with an instruction execution system, apparatus, or component. In the present disclosure, a computer-readable signal medium may include a data signal, in which a computer-readable program code is borne, propagated in the baseband or as part of a carrier. Such propagated data signals may take many forms, including but not limited to electromagnetic signals, optical signals, or any suitable combination of the preceding. The computer-readable signal medium can also be any computer-readable medium other than the computer-readable storage medium. The computer-readable signal medium may send, propagate, or transmit a program for use by or in combination with an instruction execution system, apparatus, or component. The program code contained in the computer-readable medium can be transmitted with any appropriate medium, including but not limited to: a wire, an optical cable, radio frequency (RF), etc., or any appropriate combination of the foregoing.

The computer-readable medium may be included in the electronic device, or it may also exist respectively and not fitted into the electronic device.

The computer-readable medium bears one or more programs which, when executed by the electronic device, cause the electronic device to execute the method shown in the embodiments described above.

The computer program code for executing the operations of the present disclosure may be written in one or more programming languages or a combination thereof. The programming languages include object-oriented programming languages such as Java, Smalltalk, C++, and conventional procedural programming languages such as "C" language or similar programming languages. The program code can be executed completely on a user computer, partially on the user computer, as one independent software package, partially on the user computer and partially on a remote computer, or completely on the remote computer or server. In the case involving a remote computer, the remote computer may be connected to the user computer through any kind of network, including a local area network (LAN) or a wide area network (WAN), or may be connected to an external computer (e.g. through an Internet connection by using an Internet service provider).

The flowcharts and block diagrams in the drawings illustrate the architecture, functionality, and operation of possible implementations of a system, a method, and a computer program product according to various embodiments of the present disclosure. In this regard, each block in the flowchart or block diagram may represent one module, a program segment, or a portion of the code, which contains one or more executable instructions for implementing the specified logical function. It should also be noted that in some alternative implementations, the functions noted in the blocks may occur out of the order noted in the figures. For example, two successive blocks may in fact be executed substantially in parallel, or they may sometimes be executed in the reverse order, depending upon the functionality involved. It should also be noted that each block in the block diagram and/or flowchart, and the combination of the block(s) in the block diagram and/or flowchart, can be implemented by a dedicated hardware-based system that executes the specified function or operation, or can be realized by a combination of dedicated hardware and computer instructions.

The elements involved in the embodiments of the present disclosure can be realized by software or hardware. Where the name of the unit does not in some cases constitute a limitation on the unit itself, for example, the first acquisition unit may also be described as "a unit acquiring at least two Internet Protocol addresses".

The functions described herein above may be executed, at least in part, by one or more hardware logic parts. For example, without limitation, exemplary types of hardware logic parts that may be used include: a field programmable gate array (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the preceding. More specific examples of a machine-readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the preceding.

In a first aspect, according to one or more embodiments of the present disclosure, an information processing method is provided, including:
  acquiring comment data corresponding to at least one target media content, where the target media content is media content that has an association with a preset object, and the comment data includes text data and/or video data and/or audio data;
  acquiring at least one question-and-answer content related to the preset object in the comment data, where the question-and-answer content includes question content and at least one answer content for the question content;
  aggregating and displaying the at least one question-and-answer content on an interface associated with the preset object.

According to one or more embodiments of the present disclosure, where acquiring the comment data corresponding to the at least one target media content, includes: acquiring at least one target media content with at least one interactive data quantity exceeding a preset comment quantity threshold and/or a quantity of plays exceeding a preset play quantity threshold; acquiring the comment data for the at least one target media content.

According to one or more embodiments of the present disclosure, the target media content includes a label corresponding to the preset object, and/or, text content corresponding to the target media content includes a field associated with the preset object, and/or, the comment data corresponding to the target media content includes a field associated with the preset object, and/or, image content corresponding to the target media content includes an image corresponding to the preset object.

According to one or more embodiments of the present disclosure, where acquiring the at least one question-and-answer content related to the preset object in the comment data, includes: acquiring question data related to the preset object in the comment data; screening the question data in the comment data according to at least one preset target topic to obtain at least one question data, where the target topic is a characteristic information topic corresponding to the preset object; acquiring answer data corresponding to the question data and determining whether the answer data is associated with the preset target topic; if a result of the determination shows that the answer data is associated with the preset target topic, determining the answer data as target answer data corresponding to the question data; determining the at least one question data and at least one target answer data corresponding to each question data as the at least one question-and-answer content.

According to one or more embodiments of the present disclosure, where determining whether the answer data is associated with the preset target topic, includes: determining whether the answer data includes the preset target topic, and/or whether the answer data includes a target field corresponding to the target topic, to obtain the result of the determination.

According to one or more embodiments of the present disclosure, where acquiring the at least one question-and-answer content related to the preset object in the comment data, includes: inputting the comment data into a preset question-and-answer content extraction model to obtain the at least one question-and-answer content related to the preset object in the comment data; where the question-and-answer content extraction model is obtained after training a preset model to be trained by using a sample question-and-answer content data set, the sample question-and-answer content data set includes comment data corresponding to multiple target media content and annotation information corresponding to each comment data, and the annotation information is used for representing whether the comment data includes question-and-answer content.

According to one or more embodiments of the present disclosure, where aggregating and displaying the at least one question-and-answer content on the interface associated with the preset object, includes: aggregating, according to the similarity information between respective question-and-answer content, question-and-answer content whose similarity exceeds a preset similarity threshold to determine target question-and-answer content; displaying the target question-and-answer content on the interface associated with the preset object.

According to one or more embodiments of the present disclosure, the method further includes: determining a quantity of question-and-answer content whose similarity with the target question-and-answer content exceeds a preset threshold; updating a quantity of followers corresponding to the target question-and-answer content according to the quantity of the question-and-answer content and a quantity of triggering actions from a user on a follow button associated with the target question-and-answer content.

According to one or more embodiments of the present disclosure, where after aggregating and displaying the at least one question-and-answer content on the interface associated with the preset object, the method further includes: updating a quantity of interactions of the question-and-answer content according to a quantity of interactions of the question-and-answer content on the interface associated with the preset object and a quantity of interactions of comment data corresponding to the question-and-answer content in the target media content.

According to one or more embodiments of the present disclosure, the method further includes: in response to an operation from a user for deleting comment data of target media content, deleting question-and-answer content corresponding to the comment data.

In a second aspect, according to one or more embodiments of the present disclosure, an information processing apparatus is provided, including:
  an acquiring module, configured to acquire comment data corresponding to at least one target media content, where the target media content is media content that has an association with a preset object, and the comment data includes text data and/or video data and/or audio data;
  an extracting module, configured to acquire at least one question-and-answer content related to the preset object in the comment data, where the question-and-answer content includes question content and at least one answer content for the question content;
  a displaying module configured to aggregate and display the at least one question-and-answer content on an interface associated with the preset object.

According to one or more embodiments of the present disclosure, the acquiring module is configured to: acquire at least one target media content with at least one interactive data quantity exceeding a preset comment quantity threshold and/or a quantity of plays exceeding a preset play quantity threshold; acquire the comment data for the at least one target media content.

According to one or more embodiments of the present disclosure, the target media content includes a label corresponding to the preset object, and/or, text content corresponding to the target media content includes a field associated with the preset object, and/or, the comment data corresponding to the target media content includes a field associated with the preset object, and/or, image content corresponding to the target media content includes an image corresponding to the preset object.

According to one or more embodiments of the present disclosure, the extracting module is configured to: acquire question data related to the preset object in the comment data; screen the question data in the comment data according to at least one preset target topic to obtain at least one question data, where the target topic is a characteristic information topic corresponding to the preset object; acquire answer data corresponding to the question data and determining whether the answer data is associated with the preset target topic; if a result of the determination shows that the answer data is associated with the preset target topic, determining the answer data as target answer data corresponding to the question data; determine the at least one question data and at least one target answer data corresponding to each question data as the at least one question-and-answer content.

According to one or more embodiments of the present disclosure, the extracting module is configured to: determine whether the answer data includes the preset target topic, and/or whether the answer data includes a target field corresponding to the target topic, to obtain the result of the determination.

According to one or more embodiments of the present disclosure, the extracting module is configured to: input the comment data into a preset question-and-answer content extraction model to obtain the at least one question-and-answer content related to the preset object in the comment data; where the question-and-answer content extraction model is obtained after training a preset model to be trained by using a sample question-and-answer content data set, the sample question-and-answer content data set includes comment data corresponding to multiple target media content and annotation information corresponding to each comment data, and the annotation information is used for representing whether the comment data includes question-and-answer content.

According to one or more embodiments of the present disclosure, the displaying module is configured to: aggregate, according to the similarity information between respective question-and-answer content, question-and-answer content whose similarity exceeds a preset similarity threshold to determine target question-and-answer content; display the target question-and-answer content on the interface associated with the preset object.

According to one or more embodiments of the present disclosure, the apparatus further includes: a determining module, configured to determine a quantity of question-and-answer content whose similarity with the target question-and-answer content exceeds a preset threshold; an updating module, configured to update a quantity of followers corresponding to the target question-and-answer content according to the quantity of the question-and-answer content and a quantity of triggering actions from a user on a follow button associated with the target question-and-answer content.

According to one or more embodiments of the present disclosure, the apparatus further includes: an updating module, configured to update a quantity of interactions of the question-and-answer content according to a quantity of interactions of the question-and-answer content on the interface associated with the preset object and a quantity of interactions of comment data corresponding to the question-and-answer content in the target media content.

According to one or more embodiments of the present disclosure, the apparatus further includes: a deleting module, configured to delete, in response to an operation from a user for deleting comment data of target media content, question-and-answer content corresponding to the comment data.

According to a third aspect, according to one or more embodiments of the present disclosure, an electronic device is provided, the electronic device includes at least one processor and a memory;

the memory stores computer execution instructions;

the at least one processor executes the computer executed instructions stored in the memory, so that at least one processor executes the information processing method as described in the first aspect and various possible designs of the first aspect.

According to a fourth aspect, according to one or more embodiments of the present disclosure, a computer-readable storage medium in which computer execution instructions are stored is provided. When a processor executes the computer execution instructions, the information processing method as described in the first aspect and various possible designs of the first aspect is implemented.

According to a fifth aspect, according to one or more embodiments of the present disclosure, a computer program product including a computer program is provided, when the computer program is executed by a processor, the information processing method as described in the first aspect and various possible designs of the first aspect is implemented.

According to a sixth aspect, according to one or more embodiments of the present disclosure, a computer program is provided, when the computer program is executed by a processor, the information processing method as described in the first aspect and various possible designs of the first aspect is implemented.

The above description is only a preferred embodiment of the present disclosure and an explanation of the applied technical principles. Those skilled in the art should understand that the disclosure scope involved in the present disclosure is not limited to the technical solutions formed by a specific combination of the above technical features, but should also cover other technical solutions formed by a random combination of the above technical features or equivalent features thereof without departing from the above-disclosed concept. For example, a technical solution formed by replacing the above-mentioned features and the technical features disclosed in (but not limited to) the present disclosure having similar functions with each other.

Further, while operations are depicted in a particular order, this should not be construed as requiring the operations to be executed in the particular order shown or in sequential order. Under certain circumstances, multitasking and parallel processing may be advantageous. Likewise, several specific implementation details have been included in the above discussion, but these should not be construed as limiting the scope of the present disclosure. Certain features that are described in the context of separate embodiments may also be implemented in combination in a single embodiment. Conversely, various features that are described in the context of a single embodiment can also be implemented in multiple embodiments respectively or in any suitable sub-combination.

Although the subject matter has been described in language specific to structural features and/or method and logical acts, it should be understood that the subject matter defined in the appended claims is not necessarily limited to the specific features or acts described above. Rather, the specific features and acts described above are merely exemplary forms for implementing the claims.

What is claimed is:

1. An information processing method, applied to an information processing apparatus, wherein the method comprises:
acquiring, by a processor of the information processing apparatus, at least one target media content, wherein the target media content is media content that has an association with a preset object, the target media content comprises a label corresponding to the preset object, and the label is configured to be triggered by a user to enter an interface associated with the preset object from an interface for displaying the target media content;
acquiring, by the processor of the information processing apparatus, at least one question-and-answer content related to the preset object, wherein the at least one question-and-answer content is acquired from at least one comment data related to the at least one target media content, the comment data comprises at least one of text data, video data or audio data, and the question-and-answer content comprises question content and at least one answer content for the question content; and
aggregating and displaying, by the processor of the information processing apparatus, the at least one question-and-answer content on the interface associated with the preset object.

2. The method according to claim 1, wherein each of the at least one target media content to which the at least one comment data corresponds satisfies at least one of following conditions: at least one interactive data quantity of the target media content exceeds a preset comment quantity threshold, or a quantity of plays of the target media content exceeding a preset play quantity threshold.

3. The method according to claim 1, wherein the target media content satisfies at least one of following:
text content corresponding to the target media content comprises a field associated with the preset object;
the comment data corresponding to the target media content comprises a field associated with the preset object; or
image content corresponding to the target media content comprises an image corresponding to the preset object.

4. The method according to claim 1, wherein acquiring, by the processor of the information processing apparatus, the at least one question-and-answer content related to the preset object in the at least one comment data corresponding to the at least one target media content, comprises:
acquiring, by the processor of the information processing apparatus, question data related to the preset object in the comment data;
screening, by the processor of the information processing apparatus, the question data in the comment data according to at least one preset target topic to obtain at least one question data, wherein the target topic is a characteristic information topic corresponding to the preset object;
acquiring, by the processor of the information processing apparatus, answer data corresponding to the question data and determining whether the answer data is associated with the preset target topic; if a result of the determination shows that the answer data is associated with the preset target topic, determining the answer data as target answer data corresponding to the question data; and
determining, by the processor of the information processing apparatus, the at least one question data and at least one target answer data corresponding to each question data as the at least one question-and-answer content.

5. The method according to claim 4, wherein determining, by the processor of the information processing apparatus, whether the answer data is associated with the preset target topic, comprises at least one of:
determining, by the processor of the information processing apparatus, whether the answer data comprises the preset target topic; or
determining, by the processor of the information processing apparatus, whether the answer data comprises a target field corresponding to the target topic, to obtain the result of the determination.

6. The method according to claim 1, wherein the at least one question-and-answer content related to the preset object is obtained based on the comment data.

7. The method according to claim 6, wherein acquiring, by the processor of the information processing apparatus, the at least one question-and-answer content related to the preset object in the at least one comment data corresponding to the at least one target media content, comprises:
inputting, by the processor of the information processing apparatus, the comment data into a preset question-and-answer content extraction model to obtain the at least one question-and-answer content related to the preset object in the comment data;
wherein the question-and-answer content extraction model is obtained after training a preset model to be trained by using a sample question-and-answer content data set, the sample question-and-answer content data set comprises comment data corresponding to multiple target media content and annotation information corresponding to each comment data, and the annotation information is used for representing whether the comment data comprises question-and-answer content.

8. The method according to claim 1, wherein aggregating and displaying, by the processor of the information processing apparatus, the at least one question-and-answer content on the interface associated with the preset object, comprises:
aggregating, by the processor of the information processing apparatus, according to similarity information between respective question-and-answer content, question-and-answer content whose similarity exceeds a preset similarity threshold to determine target question-and-answer content; and
displaying, by the processor of the information processing apparatus, the target question-and-answer content on the interface associated with the preset object.

9. The method according to claim 8, further comprising:
determining, by the processor of the information processing apparatus, a quantity of question-and-answer content whose similarity with the target question-and-answer content exceeds a preset threshold; and
updating, by the processor of the information processing apparatus, a quantity of followers corresponding to the target question-and-answer content according to the quantity of the question-and-answer content and a quantity of triggering actions from the user on a follow button associated with the target question-and-answer content.

10. The method according to claim 1, wherein after aggregating and displaying, by the processor of the information processing apparatus, the at least one question-and-answer content on the interface associated with the preset object, the method further comprises:

updating, by the processor of the information processing apparatus, a quantity of interactions of the question-and-answer content according to a quantity of interactions of the question-and-answer content on the interface associated with the preset object and a quantity of interactions of comment data corresponding to the question-and-answer content in the target media content.

11. The method according to claim 1, further comprising:
in response to an operation from the user for deleting comment data of target media content, deleting, by the processor of the information processing apparatus, question-and-answer content corresponding to the comment data.

12. An electronic device comprising a processor and a memory;
the memory storing computer execution instructions; and
the processor executing the computer execution instructions stored in the memory, so that the processor is caused to:
acquire at least one target media content, wherein the target media content is media content that has an association with a preset object, the target media content comprises a label corresponding to the preset object, and the label is configured to be triggered by a user to enter an interface associated with the preset object from an interface for displaying the target media content;
acquire at least one question-and-answer content related to the preset object, wherein the at least one question-and-answer content is acquired from at least one comment data related to the at least one target media content, the comment data comprises at least one of text data, video data or audio data, and the question-and-answer content comprises question content and at least one answer content for the question content; and
aggregate and display the at least one question-and-answer content on the interface associated with the preset object.

13. The electronic device according to claim 12, wherein each of the at least one target media content to which the at least one comment data corresponds satisfies at least one of following conditions: at least one interactive data quantity of the target media content exceeds a preset comment quantity threshold, or a quantity of plays of the target media content exceeding a preset play quantity threshold.

14. The electronic device according to claim 12, wherein the processor is caused to:
acquire question data related to the preset object in the comment data;
screen the question data in the comment data according to at least one preset target topic to obtain at least one question data, wherein the target topic is a characteristic information topic corresponding to the preset object;
acquire answer data corresponding to the question data and determine whether the answer data is associated with the preset target topic; if a result of the determination shows that the answer data is associated with the preset target topic, determine the answer data as target answer data corresponding to the question data; and determine the at least one question data and at least one target answer data corresponding to each question data as the at least one question-and-answer content.

15. The electronic device according to claim 14, wherein the processor is caused to perform at least one of following operations:
determining whether the answer data comprises the preset target topic; or
determining whether the answer data comprises a target field corresponding to the target topic, to obtain the result of the determination.

16. The electronic device according to claim 12, wherein the processor is caused to:
aggregate, according to similarity information between respective question-and-answer content, question-and-answer content whose similarity exceeds a preset similarity threshold to determine target question-and-answer content; and
display the target question-and-answer content on the interface associated with the preset object.

17. The electronic device according to claim 16, wherein the processor is further caused to:
determine a quantity of question-and-answer content whose similarity with the target question-and-answer content exceeds a preset threshold; and
update a quantity of followers corresponding to the target question-and-answer content according to the quantity of the question-and-answer content and a quantity of triggering actions from the user on a follow button associated with the target question-and-answer content.

18. The electronic device according to claim 12, wherein the processor is further caused to:
update a quantity of interactions of the question-and-answer content according to a quantity of interactions of the question-and-answer content on the interface associated with the preset object and a quantity of interactions of comment data corresponding to the question-and-answer content in the target media content.

19. The electronic device according to claim 12, wherein the processor is further caused to:
in response to an operation from the user for deleting comment data of target media content, delete question-and-answer content corresponding to the comment data.

20. A non-transitory computer-readable storage medium in which computer execution instructions are stored, when a processor executes the computer execution instructions, the processor is caused to:
acquire at least one target media content, wherein the target media content is media content that has an association with a preset object, the target media content comprises a label corresponding to the preset object, and the label is configured to be triggered by a user to enter an interface associated with the preset object from an interface for displaying the target media content;
acquire at least one question-and-answer content related to the preset object, wherein the at least one question-and-answer content is acquired from at least one comment data related to the at least one target media content, the comment data comprises at least one of text data, video data or audio data, and the question-and-answer content comprises question content and at least one answer content for the question content; and aggregate and display the at least one question-and-answer content on the interface associated with the preset object.

\* \* \* \* \*